(12) United States Patent
Hanson et al.

(10) Patent No.: US 8,451,996 B2
(45) Date of Patent: *May 28, 2013

(54) AUTOMATIC MUTE DETECTION

(71) Applicant: AT&T Intellectual Property II, L.P., via transfer from AT&T Corp., Atlanta, GA (US)

(72) Inventors: Karrie Hanson, Westfield, NJ (US); Eric Cheung, New York, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,374

(22) Filed: Oct. 1, 2012

(65) Prior Publication Data
US 2013/0029649 A1 Jan. 31, 2013

Related U.S. Application Data

(63) Continuation of application No. 12/283,657, filed on Sep. 15, 2008, now Pat. No. 8,311,196.

(51) Int. Cl.
*H04M 3/42* (2006.01)

(52) U.S. Cl.
USPC .............. 379/202.01; 709/204; 709/227

(58) Field of Classification Search
USPC .............. 379/202.01; 709/204, 227
See application file for complete search history.

(56) References Cited

U.S. PATENT DOCUMENTS

| 7,180,997 B2 | 2/2007 | Knappe |
| 2003/0185371 A1 | 10/2003 | Dobler |
| 2009/0060157 A1 | 3/2009 | Kim et al. |

*Primary Examiner* — Quynh Nguyen

(57) ABSTRACT

A system and methodology for managing a mute function muting a connection to a conference call is disclosed. The system is implemented when the mute function is activated on a line connected to a conference call through a telecommunications network. The method includes receiving a sound, determining whether the sound meets predetermined criteria and if the sound meets predetermined criteria then performing a mute status operation.

20 Claims, 5 Drawing Sheets

AUTOMATIC MUTE DETECTION

CROSS REFERENCE TO RELATED APPLICATIONS

This application is a continuation of co-pending U.S. patent application Ser. No. 12/283,657, entitled "Automatic Mute Detection," filed on Sep. 15, 2008, the disclosure of which is incorporated herein by reference in its entirety.

FIELD OF THE INVENTION

The present invention relates generally to telecommunications services, and more particularly, to systems and methods for providing automatic mute detection for conference call users.

BACKGROUND OF THE INVENTION

Conference calls are an integral part of personal, corporate and government communication. As used herein, a conference call is defined as a telephone call in which multiple parties participate, each party having the ability to both listen and speak, in the voice, audio, text, video and/or graphics portion of the call. The telephone call may be a traditional land based wired telephone, Voice over Internet Protocol (VoIP) telephone or a mobile or cell phone. Some conference calls are uni-directional, such as a corporate announcement or a news conference where audio and sometimes text, video and/or graphics are delivered from one point to many, in just one direction.

Conference calls have the potential to touch a plurality of communication systems including a traditional public switched telephone network (PSTN), the Internet and wireless platforms. In addition, providing a conference call service requires the ability to interface with a plurality of Customer Premises Equipment (CPE) with high quality, high reliability and low latency (time delay).

A CPE may be a tabletop telephony device found in many conference rooms and offices, but is in no way limited to that configuration. As used herein, a teleconference-enabled CPE is defined as a device that allows users to participate in a multi-party teleconference call. Examples of CPE are traditional wired telephones, Internet (VoIP) telephony devices, wireless devices such as Smartphones/PDAs, and dashtop/automotive devices that communicate with public/private networks, cell or mobile phone networks, satellite networks or other networks.

The functionality necessary to conduct a conference call may be located remotely on a network coupled to a CPE or within a CPE locally. For example, the functionality may reside with a teleconference service provider organization whose business is providing conference call services. Services provided by such organizations vary in calling features, level of customer service support and price. Typical services offered by a conference call service provider may include: enter and announce (all new participants to a conference call are announced to all parties attending), call recording (call is recorded for historical purposes, transcription or playback at a later time), secured calling (no one can enter the call without permission of the host, mainly for security/confidentiality reasons), and listen only, just to name a few.

Teleconference service providers usually offer full-duplex capability, whereby all participants in a conference call can both transmit to and receive from all other participants simultaneously. In the context of a regular telephone call, full-duplex capability may be thought of as a two-lane road from source to destination where signals can be sent in both directions simultaneously. A teleconference service provider typically uses a conference bridge to facilitate its calling service by providing two main functions: 1) enabling a plurality of CPE devices (which may operate with a variety of technologies) to connect to the bridge, and 2) enabling simultaneous full-duplex capability between all participants.

A feature almost universally found in teleconference telephony systems is the mute function. When the mute function status is "activated," it stops or prevents audio signals from a particular microphone (or microphones) of a CPE from contributing audio to the conference call. Effectively, the functionality a microphone is temporarily disabled. Typically, that is done to minimize contributing background noise to the call or when a discussion within a group is desired without disrupting others or having others listen in. Frequently, users forget to change the mute function status to "deactivated" as they attempt to rejoin a conference call, only to realize that they are muted when no one responds to their dialogue. That is not a desirable user experience: it can be embarrassing, can waste the time of the teleconference call participants and can disrupt the flow of an entire discussion.

It would therefore be desirable to provide systems and methods for automatic mute detection for use during a teleconference call. To the inventors' knowledge, no such system or method currently exists.

SUMMARY OF THE INVENTION

In accordance with a first aspect of the present invention, there is disclosed a method for managing a mute function muting a connection to a conference call through a telecommunications network, a current status of the mute function being "activated." The method comprises the steps of receiving a sound; determining whether the sound meets predetermined criteria; and, if the sound meets the predetermined criteria, then performing a mute status operation.

The step of determining whether the sound meets predetermined criteria may comprise determining whether the sound is speech and may further comprise determining whether the speech is spoken by a predetermined speaker.

The step of determining whether the sound meets predetermined criteria may comprise determining whether the sound exceeds a predetermined volume level.

The step of performing a mute status operation may comprise changing a status of the mute function from "activated" to "deactivated."

Performing a mute status operation may comprise generating a mute status notification for notifying a user that the mute has an "activated" status. The notification may be an audio signal delivered by a CPE. The audio signal may increase in volume so long as the received sound is detected by the CPE. The mute status notification may be a message sent to a device other than the CPE.

The step of determining whether the sound meets predetermined criteria may be performed in the telecommunications network outside a CPE or by a CPE.

The method may further comprise the step of altering the predetermined criteria based at least in part on sounds previously received by a CPE.

In accordance with a second aspect of the present invention, there is disclosed an apparatus for use in conducting conference calls, the apparatus comprising: a microphone for converting received sound to an electrical signal representing the received sound; a user-activated mute function having an "activated" status to prevent the electrical signal from being transmitted to other users in a conference call, and a "deactivated" status to permit the electrical signal to be transmitted; a processor; a data storage unit connected to the processor and containing instructions that, when executed by the processor, cause the processor to determine whether the user-activated mute function is "activated"; and, if so, then to determine whether the electrical signal representing the received sound meets predetermined criteria; and, if so, then to perform a mute status operation.

The predetermined criteria may include whether the sound is speech.

The mute status operation may comprise changing a status of the mute function from "activated" to "deactivated."

The mute status notification may be an audio signal delivered by the CPE, the audio signal increasing in volume so long as the electrical signal representing the received sound is determined to meet the predetermined criteria.

In accordance with a third aspect of the present invention, there is disclosed a telecommunications network, comprising a teleconference bridge connected through the network to a plurality of users; a mute function associated with the teleconference bridge, the mute function having an "activated" status wherein, upon receiving a mute command, the mute function prevents signals from a first user from being transmitted to other users in a conference call, the mute function further having a "deactivated" status to permit the signals to be transmitted; a detector connected for receiving signals from the first user through the network when the mute function is "activated" for the first user, and configured for determining whether the received signals meet predetermined criteria; and a prompter for performing a mute status operation contingent upon the received signals meeting the predetermined criteria.

The predetermined criteria may include whether the sound is speech.

The mute status operation may comprise changing a status of the mute function from "activated" to "deactivated."

The mute status operation may comprise an audio notification delivered by a CPE, the audio notification increasing in volume so long as the received signals meet predetermined criteria.

These aspects of the invention and further advantages thereof will become apparent to those skilled in the art as the present invention is described with particular reference to the accompanying drawings.

DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

The present invention is a system, apparatus and method for automatic mute detection for teleconference call users. When a teleconference participant mutes his line, the system of the invention monitors sounds detected on the muted line. If a detected sound meets predetermined criteria such as matching the participant's voice, the system performs an operation such as un-muting the line. In that way, the problem of inadvertently speaking on a muted line is avoided.

Figure 1:
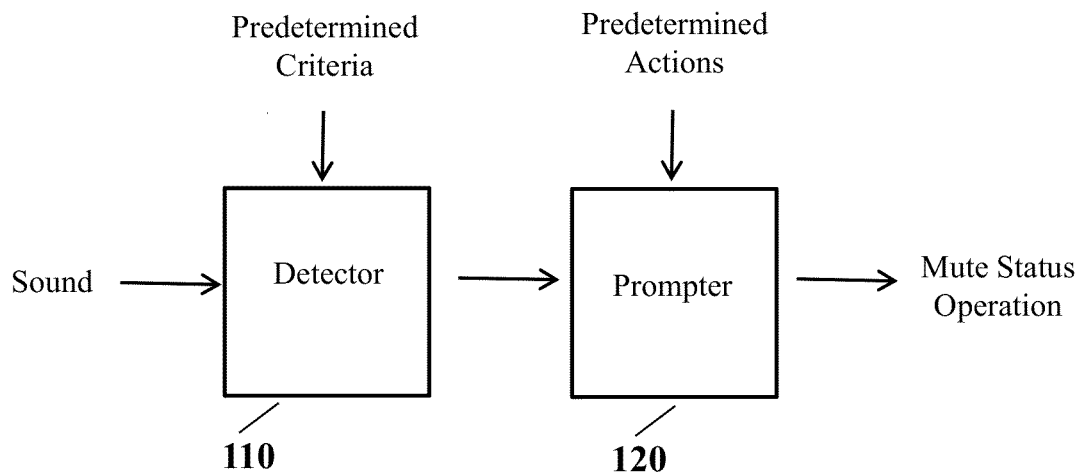
FIG. 1 is a functional block diagram of the detector and prompter in accordance with the present invention.

FIG. 1 is a functional block diagram 100 of the detector and prompter in accordance with the present invention. The automatic mute detection system has two main operating elements: a sound detector 110 and a prompter 120. When a line is muted and the detector 110 detects a sound on that line, the sound is compared to predetermined criteria. When the sound meets the predetermined criteria, the prompter 120 implements predetermined actions in the form of mute status operations.

The predetermined criteria of the sound detector 110 may include user-definable criteria, system defaults or incorporate machine learning. Sound or the representation of sound is compared to the predetermined criteria by the detector 110. The sound detector may be a waveform detector that measures overall sound level or sound energy. The sound detector may be a speech detector with the ability to distinguish between individual users by comparing incoming sound to a stored user-provided reference. The predetermined criteria may be generic, such as the detection of any sound or the detection of any human voice.

The prompter 120 implements mute status operations based on predetermined actions, which may include user definable actions, system defaults or incorporate machine learning. The mute status operations may include, for example, un-muting the line or presenting a whisper tone such as, "You are muted." Certain must status operations may be performed only when specific predetermined criteria are met.

Sound detection in the system of the invention may be performed within a network offering a teleconferencing service, or may be performed at the CPE. The location of the detection function of the invention depends, in part, on where sound mixing is performed. Sound mixing is where multiple audio streams, such as from two CPEs, are mixed together and presented to the speaker of another CPE.

If sound mixing is done by the CPE, that necessitates that detection be performed by CPE. In that configuration, there are full-duplex connections from every CPE participating in the teleconference call to one or more other CPEs with no sound mixing by the network. Because the sound is mixed by the CPE, the network cannot differentiate which CPE originated the sound. That configuration is explained in more detail below with reference to FIG. 2.

On the other hand, sound mixing may be performed within the network by a device called a mixer. In that configuration there are full-duplex connections from every CPE participating in the teleconference call to the mixer. The mixer can differentiate which CPE originated the sound and can therefore implement the mute detection functions of the invention. Alternatively, that configuration may also support sound detection by the CPE, provided the CPE has been configured to perform the detection function. This configuration is explained in more detail below with reference to FIG. 3.

Figure 2:
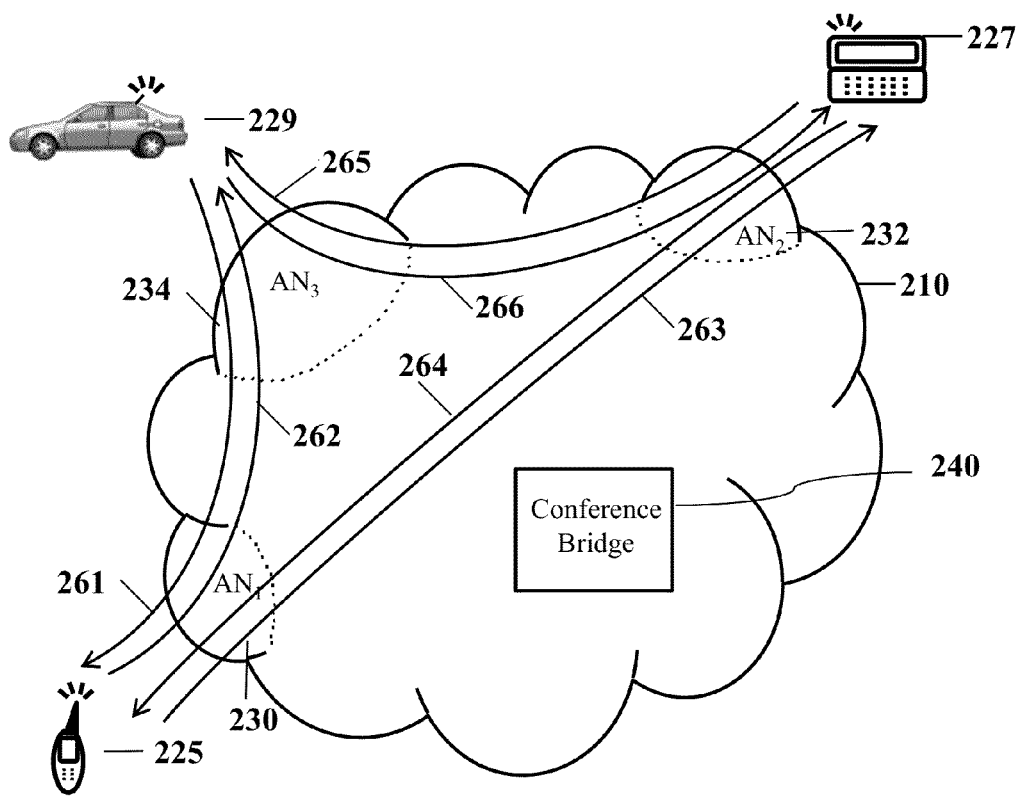
FIG. 2 is a functional block diagram of a teleconference network in accordance with one embodiment of the present invention including automatic mute detection with sound mixing performed by the CPE.

FIG. 2 is a functional block diagram of a teleconference system 200 in accordance with one embodiment of the present invention including automatic mute detection with sound mixing performed by the CPE. In the system 200, each participating CPE in the teleconference call is coupled to a respective access network (AN) to reach a long-haul network. Specifically, CPE 225, 227 and 229 are coupled respectively through $AN_1$ 230, $AN_2$ 232 and $AN_3$ 234 to reach the network 210. The conference bridge 240 may provide application logic facilitating full-duplex communication. In this example the CPEs are wireless devices, but any device fixed or wireless which enables the system functionality could be utilized. Sound mixing in the teleconference system 200 is provided by one or more of the CPEs. The system 200 is commonly referred to as having full mesh connectivity as illustrated by the three pairs of directional arrows from every CPE to every other CPE. Pairs of arrows are shown as 261-262, 263-264 and 265-266. In another one conference call configuration, each CPE is linked by a full-duplex connection to a single "host" CPE. Sound mixing in that configuration is performed by the "host" CPE.

Because sound mixing in each of the above examples is performed at one or more CPEs, and the mixed signals traversing the network 210 cannot be identified with particular CPEs, the sound detection of the present invention cannot be performed within the network and must be performed by a CPE. Further, a local mute function such as a "mute" button on a CPE, typically prevents sound signals originating at the CPE from being transmitted into the network. For example, when CPE 225 manually activates the mute function, links 262 and 263 are temporarily disabled and therefore no longer contributing audio to the conference call. Under those conditions, the detection function of the invention must also be performed locally, at the CPE.

Figure 3:
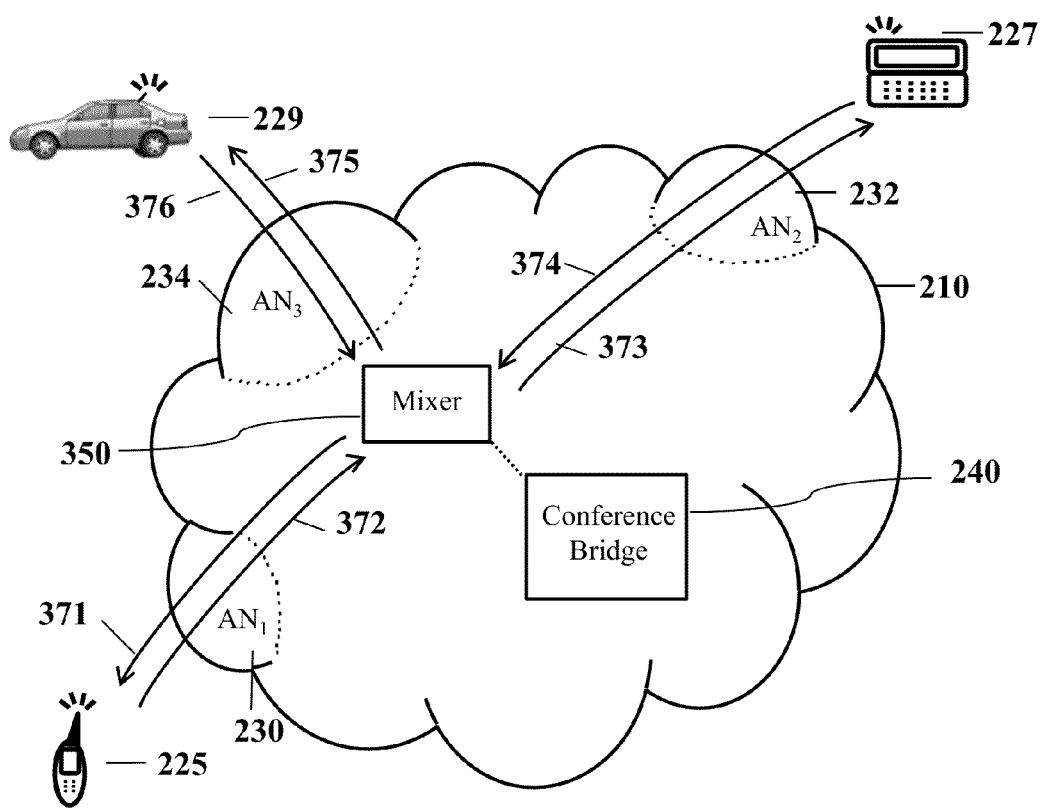
FIG. 3 is a functional block diagram of a teleconference network in accordance with an aspect of the present invention wherein automatic mute detection with sound mixing is performed by a mixer disposed in the telecommunications network.

FIG. 3 is a functional block diagram of a teleconference network 300 in accordance with an aspect of the present invention wherein automatic mute detection with sound mixing is performed by a mixer disposed in the telecommunications network. This system 300 is similar to the system 200 with two differences: 1) the addition of a device called a mixer 350 and 2) full-duplex coupling of CPEs to the mixer instead of to other CPEs. A conference bridge 240 provides the application logic and is coupled to the mixer 350. The mixer 350 mixes audio from the participating CPEs and transmits the mixed signal to each CPE. Because the mixer 350 receives audio signals from each CPE, sound detection in the teleconference system 300 may be performed by either the mixer 350 or a CPE. The automatic mute detection system of network 300 has the same functionality from the users' perspective as network 200. Collectively, pairs of arrows illustrate full-duplex communication between CPE devices and the mixer 350. In this example, paired links are shown as 371-372, 373-374 and 375-376.

In the embodiment where the user of CPE 225 manually activates the mute function while sound detection and mixing are being performed by the mixer 350, the links remain enabled, but the mixer 350 does not transmit the audio from link 372 into links 373 and 375. The mixer continues to receive an audio signal from the muted CPE 225, and is therefore capable of performing the audio detection function of the invention.

Alternatively, in the embodiment where the user of CPE 225 manually activates the mute function while the CPE is performing the sound detection and the mixer 350 is performing the mixing, link 372 is temporarily disabled; thereby not communicating audio to the mixer 350 and as a result, no audio from CPE 225 is communicated to links 373 and 375. In that case, the detection function of the invention must be performed at the CPE 225.

Using the basic configurations of the mute detection system described above, many variations of the invention are possible. In one simple embodiment, when a CPE is muted and sound having a sound energy above a predetermined threshold is detected, the prompter deactivates the mute function and the line returns to its normal condition.

In another embodiment, when sound above a predetermined threshold is received by the detector, the prompter transmits an audio reminder to the user reminding the user that the user's line is muted. The audio reminder may be a tone or simulated or recorded whisper tone such as "You are muted." A visual reminder may also be presented, such as a light or a displayed message on the user's CPE interface. A combination of an audio and visual reminder may also be used.

The audio reminder may start at a low tone or volume, and as the microphone continues to detect sound, the volume may be increased as a persistent reminder that the line remains muted. The muted line may alternatively be immediately unmuted in response to the user speaking a predetermined and programmed word or phrase such as "unmute."

In another embodiment, a user turns off the mute detection function and its associated functionality indefinitely or for a predetermined amount of time such as 2 minutes or 5 minutes before reengaging, as determined by user preferences.

The mute status of a line may be manually activated or deactivated using a Web interface. For example, mute status may be activated or deactivated using stationary or mobile computers, cell phones, Smartphones/PDAs and the like.

In another embodiment, individual CPE devices may have the capability to recognize multiple users and enable user specific actions. For example, a CPE could be programmed such that when user A's voice is detected the predetermined preference is to immediately unmute and when user B's voice is detected the predetermined preference is to play a whisper tone of "You are muted."

Machine learning may be included in the functionality of the system. In that case, algorithms and techniques are developed by analyzing usage patterns and how users modify the functionality of the prompter based on actual system use in order to adjust the prompter actions. For example, when a user hums or the environment within which the CPE is operated has periodic or intermittent noises, the system may learn those sounds and perform (or not perform) certain actions upon their detection. The noises could include an air conditioning fan cycling on and off, nearby doors opening or closing or an elevator bell.

In another embodiment, the user may be alerted, as determined by predetermined user preferences, when the user rejoins the conference. That function avoids a private or confidential conversation from being broadcast into the conference after a mute function is deactivated automatically.

Figure 4:
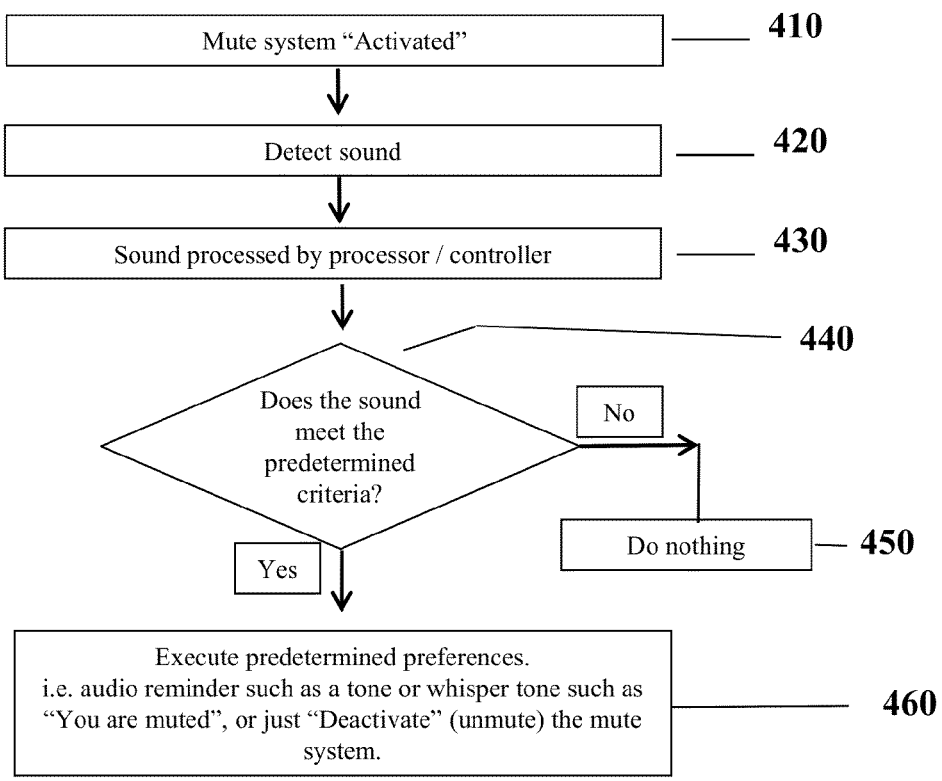
FIG. 4 is a flow chart depicting an exemplary method in accordance with the present invention.

FIG. 4 is a flow chart depicting an exemplary method 400 in accordance with the present invention. In the method 400, sound which meets predetermined criteria executes predetermined action preference. The mute system is "activated" in step 410, muting a line participating in a conference call. For example, a "mute" button may be manually pressed on a CPE, or a touch tone code may be keyed in. Sound from a microphone on the muted line is detected in step 420. The sound may be detected by a teleconferencing service within the network, or alternatively, at a CPE. The sound is processed by a processor/controller in step 430 in order to determine one or more characteristics of the sound. For example, a sound level may be measured, a human speaker may be identified, or words may be recognized. In step 440, a determination is made as to whether or not the processed sound meets the predetermined criteria. If the criteria are not met, step 450 is taken, which is to do nothing. If the criteria is met, step 460 is taken to execute the mute status operations according to predetermined preferences. The possible mute status operations are only limited by the CPE's preprogrammed capability, and may include an audio reminder such as a tone or a whisper tone such as "You are muted" or may simply "deactivate" the mute system.

Figure 5:
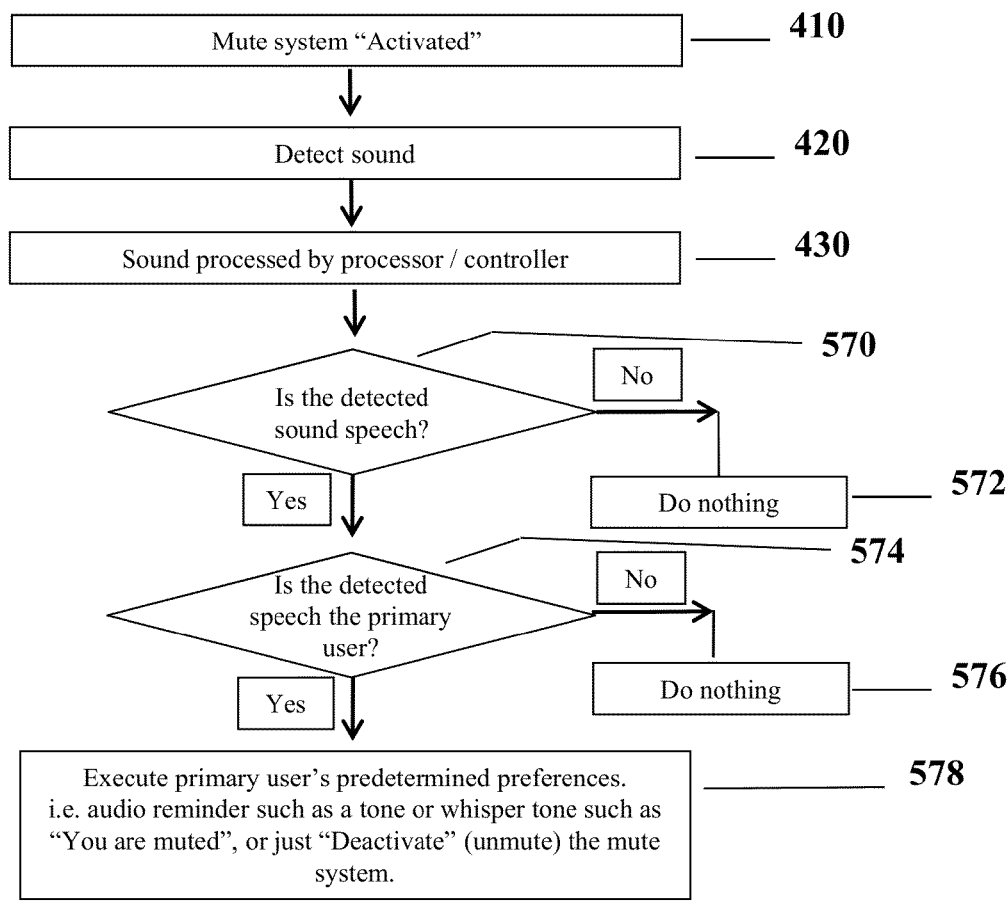
FIG. 5 is a flow chart depicting an alternative method in accordance with the present invention.

FIG. 5 is a flow chart depicting an alternative method 500 in accordance with the present invention. The method 500 is similar to method 400, but depicts a specific case of the prompter performing an action when a primary user is detected by the detector. In method 500, the first three steps are the same as in method 400. In step 570, a determination is made as to whether or not the detected sound is speech. If it is not speech, step 572 is taken, which is to do nothing. If speech is detected, a further determination is made as to if the speech is that of the primary user of the CPE in step 574. If it is not the primary user, step 576 is taken, which is to do nothing. If the speech is from the primary user, step 578 is taken to execute the primary user's predetermined preferences.

Possible uses for the current invention may include, but not be limited to, teleconference calls and services and customer care/customer service calls and services.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for managing a mute function that mutes a conference call connection from a particular customer premises equipment to a mixer in a telecommunications network, the method comprising:
   receiving, by the mixer, a mute command from the particular customer premises equipment;
   placing, by the mixer, the conference call connection in a muted condition, in response to the mute command;
   receiving, by the mixer, a signal representing sound detected by the particular customer premises equipment;
   processing the signal representing sound to determine characteristics of the sound identifying a human speaker;
   determining that the human speaker is a primary user of the particular customer premises equipment; and
   based on the determination that the human speaker is the primary user of the particular customer premises equipment, executing predetermined preferences of the primary user including placing the conference call connection in an unmuted condition.

2. The method of claim 1, wherein executing predetermined preferences of the primary user includes generating a mute status notification for notifying a user that the particular customer premises equipment in a muted condition.

3. The method of claim 2, wherein the mute status notification is an audio signal delivered by the particular customer premises equipment.

4. The method of claim 3, wherein the audio signal increases in volume.

5. The method of claim 2, wherein the mute status notification is a message sent to a device other than the particular customer premises equipment.

6. The method of claim 1, wherein the determining is performed by the mixer.

7. The method of claim 1, wherein the determining is performed by a conference bridge connected to the mixer.

8. The method of claim 1, wherein the processing is performed by the mixer.

9. The method of claim 1, wherein the processing is performed by a conference bridge connected to the mixer.

10. The method of claim 1, wherein the particular customer premises equipment is a mobile telephone.

11. A non-transitory computer-usable medium having stored thereon computer readable instructions for managing a mute function that mutes a conference call connection from a particular customer premises equipment to a mixer in a telecommunications network, wherein execution of the computer readable instructions by a processor causes the processor to perform operations comprising:
   receiving a mute command from the particular customer premises equipment;
   placing the conference call connection in a muted condition, in response to the mute command;
   receiving a signal representing sound detected by the particular customer premises equipment;
   processing the signal representing sound to determine characteristics of the sound identifying a human speaker;
   determining that the human speaker is a primary user of the particular customer premises equipment; and based on the determination that the human speaker is the primary user of the particular customer premises equipment, executing predetermined preferences of the primary user including placing the conference call connection in an unmuted condition.

12. The non-transitory computer-usable medium of claim 11, wherein executing predetermined preferences of the primary user includes generating a mute status notification for notifying a user that the particular customer premises equipment in a muted condition.

13. The non-transitory computer-usable medium of claim 12, wherein the mute status notification is an audio signal delivered by the particular customer premises equipment.

14. The non-transitory computer-usable medium of claim 13, wherein the audio signal increases in volume.

15. The non-transitory computer-usable medium of claim 12, wherein the mute status notification is a message sent to a device other than the particular customer premises equipment.

16. The non-transitory computer-usable medium of claim 11, wherein the determining is performed by the mixer.

17. The non-transitory computer-usable medium of claim 11, wherein the determining is performed by a conference bridge connected to the mixer.

18. The non-transitory computer-usable medium of claim 11, wherein the processing is performed by the mixer.

19. The non-transitory computer-usable medium of claim 11, wherein the processing is performed by a conference bridge connected to the mixer.

20. The non-transitory computer-usable medium of claim 11, wherein the particular customer premises equipment is a mobile telephone.

* * * * *